M. ARMENTROUT.
CUTTING APPARATUS FOR MOWING OR REAPING MACHINES.
APPLICATION FILED MAY 12, 1910.
996,825.
Patented July 4, 1911.
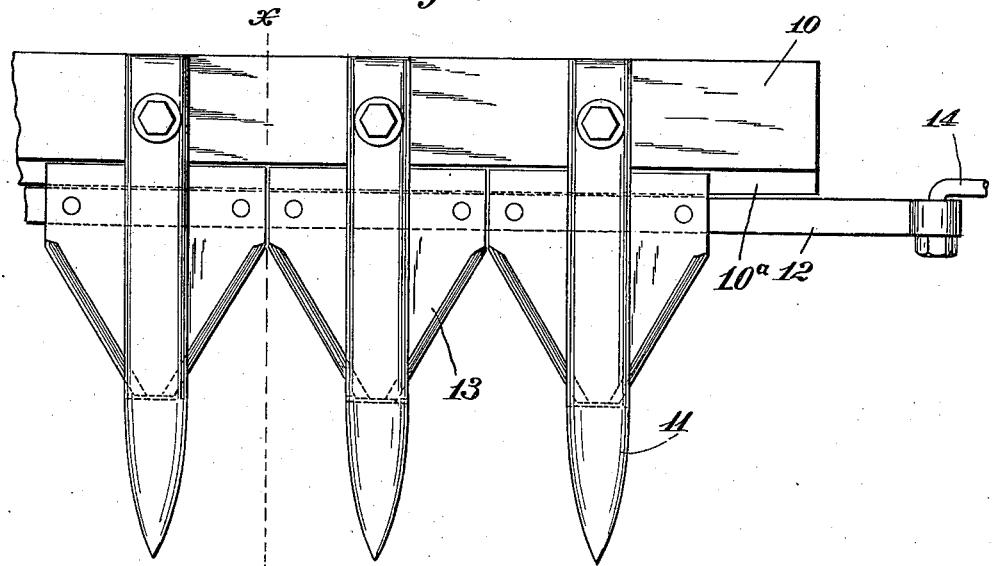
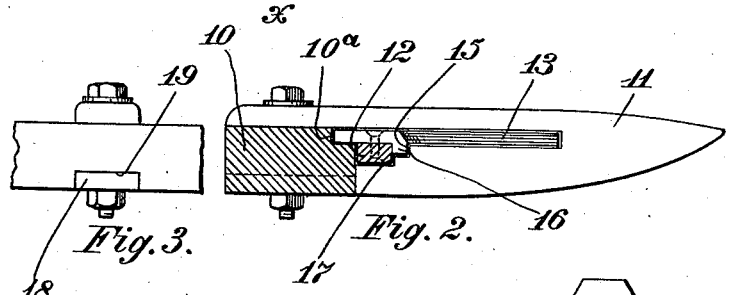
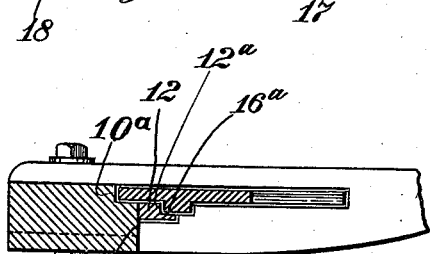
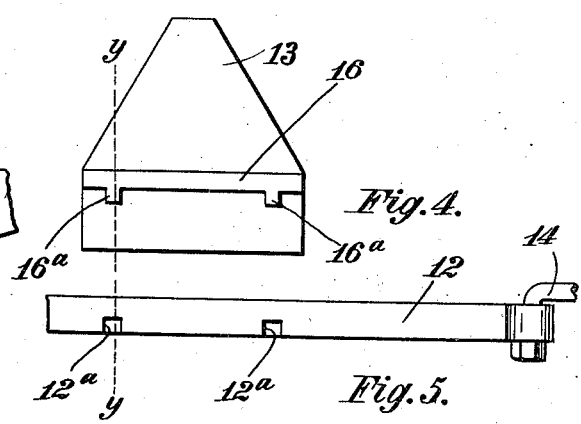
Witnesses
Benjamin Finckel
Mayme Foard
Inventor
Melvin Armentrout
by Finckel & Finckel
his Attorneys

UNITED STATES PATENT OFFICE.

MELVIN ARMENTROUT, OF PLEASANT TOWNSHIP, FRANKLIN COUNTY, OHIO, ASSIGNOR OF ONE-HALF TO JOHN RIPPLE, OF JACKSON TOWNSHIP, OHIO.

CUTTING APPARATUS FOR MOWING OR REAPING MACHINES.

996,825.      Specification of Letters Patent.      Patented July 4, 1911.

Application filed May 12, 1910. Serial No. 560,807.

*To all whom it may concern:*

Be it known that I, MELVIN ARMENTROUT, a citizen of the United States, residing in Pleasant township, in the county of Franklin and State of Ohio, have invented a certain new and useful Improvement in Cutting Apparatus for Mowing or Reaping Machines, of which the following is a specification.

The object of this invention is to provide an improved cutting apparatus for mowing or reaping machines of simple and economical construction and from which the grass or other material cut can pass freely and shall not be so likely as heretofore to become entangled with or to clog the apparatus.

The invention is embodied in the construction and combination of features herein shown and described and then pointed out in the appended claim.

In the accompanying drawing—Figure 1 is a plan view showing a portion of a sickle bar according to the invention. Fig. 2 is a section on the line $x$—$x$ Fig. 1 with the knife and finger or guard in full. Fig. 3 is a rear view at the place of connection of one of the fingers. Fig. 4 is a view of the underside of a knife showing the securing members therein. Fig. 5 is a plan view of a portion of knife bar for receiving the knife shown in Fig. 4. Fig. 6 is a transverse section of the finger bar with a finger thereon and the knife bar with a knife thereon the knife bar and knife being in section on the line $y$—$y$ Figs. 4 and 5.

In the views 10 designates the finger bar provided with a longitudinal rabbet $10^a$ in its forward edge and 11 the fingers attached to the finger bar. The upper and lower portions or tongues of the finger are integrally connected with each other.

12 designates the knife bar, and 13 the knives thereon. In operation the knife bar is reciprocated by any suitable mechanism as, for example, through a connecting rod 14 connected with a crank pin as usual.

The fingers 11 in the instance shown are each provided with a shoulder 15 for the forward side of a rib 16 on the lower side of the knife. These fingers each also have a shoulder 17 for the knife bar 12 and a tongue 18 fronted by a shoulder $18^a$ said tongue to fit in a transverse recess 19 at the lower side of the finger bar. The lower side of the upper portion or tongue of the finger is made plain or flat and when in place on the finger bar lies flush with the upper side of said bar.

The knife in its cutting portion is of ordinary outline and form but is flat over its top and when connected with the knife bar its upper side fits snugly under the lower side of the upper portion or tongue of the finger the aim being to close the space between the said tongue and the upper side of the knife and leave no room for the ingress of grass or other material being cut. The heels of the knives on the bar project beyond the rear edge of the latter and into the rabbet $10^a$ of the finger bar and so that the upper surface of the knife shall be flush with the finger bar. The knife can be riveted as usual to the knife bar as shown in Figs. 1 and 2, but it is an important feature of my present invention to dispense with such rivets, therefore, I provide the rib 16 at its rear side with one or more projections $16^a$ to fit in notches or recesses $12^a$ in the knife bar as seen in Figs. 4, 5 and 6. With this last described construction it is only necessary to remove a finger to take out a worn or damaged knife and replace it with a fresh or reground one. When a knife so constructed is used and put in place and the finger secured in its place on the finger bar the knife is held in proper position for cutting without any other securing means. It will be noted also that the shoulder 15 of the finger holds the knife from forward or rearward movement. The shoulder 17 guides and assists in preventing flexing of the knife bar. When the heels of the knives abut at their edges it may in some cases suffice to secure from longitudinal movement on the knife bar the end ones only of the knives the intermediate knives being held securely from longitudinal movement between such end ones and other movement being prevented by the fingers.

Changes in the forms of the parts can be made without departing from the gist of the invention.

What I claim is:

In cutting apparatus for mowing or reaping machines, in combination, a finger bar 10 having a rabbet $10^a$ in its forward edge, a knife bar 12, and a knife 13 provided at its lower side with a rib 16 and a projection $16^a$ to engage the forward edge of the knife bar to prevent movement of that longitudinally with reference to the knife bar, the heel of the knife projecting into said rabbet 10ª and the upper surface of the knife being substantially flush at its upper side with the upper surface of the finger bar, and fingers having shoulders 15 to engage the rib 16 said fingers being attached to the upper and lower sides of the finger bar to secure said knife from removal, substantially as described.

MELVIN ARMENTROUT.

Witnesses:
MAYME FOARD,
BENJAMIN FINCKEL.

Copies of this patent may be obtained for five cents each, by addressing the "Commissioner of Patents, Washington, D. C."